United States Patent
Davain et al.

(10) Patent No.: US 12,372,664 B2
(45) Date of Patent: Jul. 29, 2025

(54) METHOD FOR STATISTICALLY CORRECTING THE ESTIMATION OF THE STATE OF A SYSTEM AND DEVICE THEREFOR

(71) Applicant: SAFRAN ELECTRONICS & DEFENSE, Paris (FR)

(72) Inventors: Loïc Davain, Moissy-Cramayel (FR); Clément Misandeau, Moissy-Cramayel (FR)

(73) Assignee: SAFRAN ELECTRONICS & DEFENSE, Paris (FR)

( * ) Notice: Subject to any disclaimer, the term of this patent is extended or adjusted under 35 U.S.C. 154(b) by 353 days.

(21) Appl. No.: 18/170,255

(22) Filed: Feb. 16, 2023

(65) Prior Publication Data
US 2023/0258822 A1  Aug. 17, 2023

(30) Foreign Application Priority Data
Feb. 17, 2022 (FR) ........................... 2201429

(51) Int. Cl.
*G01S 19/40* (2010.01)
*G01S 19/39* (2010.01)
*G01S 19/49* (2010.01)

(52) U.S. Cl.
CPC ............ *G01S 19/40* (2013.01); *G01S 19/393* (2019.08); *G01S 19/49* (2013.01)

(58) Field of Classification Search
CPC ......... G01S 19/40; G01S 19/393; G01S 19/49
(Continued)

(56) References Cited

U.S. PATENT DOCUMENTS

| 2013/0249734 A1 | 9/2013 | Najim et al. |
| 2020/0201359 A1 | 6/2020 | Burghardt et al. |
| 2021/0293975 A1* | 9/2021 | Kana ........................ G01S 19/52 |

FOREIGN PATENT DOCUMENTS

| CN | 110720096 A | | 1/2020 | |
| CN | 113885056 A | * | 1/2022 | ............. G01S 19/20 |
| DE | 102021104425 A1 | * | 8/2022 | ............ G01C 21/165 |

OTHER PUBLICATIONS

Search Report as issued in French Patent Application No. 2201429, dated Sep. 15, 2022.
(Continued)

*Primary Examiner* — Harry K Liu
(74) *Attorney, Agent, or Firm* — Pillsbury Winthrop Shaw Pittman LLP

(57) ABSTRACT

A method for statistically correcting the estimation of the state X of a system, the state X including a physical quantity, correcting the estimation of this state X being carried out on the basis of a plurality of observations $Y_i$ relating to this state X, each observation being obtained by a different measurement relating to at least one physical quantity, the method being implemented by a device including a calculator, the method including determining for each observation $Y_i$, the difference between the observation $Y_i$ and the estimated state referred to as innovation $Z_i$, using the relationship $Z_i=Y_i-HX$ where H is the observation matrix associated with the statistical filter considered; associating an ordering parameter with each observation $Y_i$, the ordering parameter being given by the relationship $Ord_i=|Z_{ref}-Z_i|$ where $Z_{ref}$ is a predetermined reference value; classifying the measurements in ascending order of the ordering parameter associated therewith; and correcting errors on the estimations using the statistical filter.

10 Claims, 4 Drawing Sheets

(58) Field of Classification Search
USPC .................................................. 342/357.23
See application file for complete search history.

(56) References Cited

OTHER PUBLICATIONS

Liu, Y., et al., "Impact Assessment of GNSS Spoofing Attacks on INS/GNSS. Integrated Navigation System," Sensors, vol. 18, Jan. 2018, XP002800173, 20 pages.

* cited by examiner

[Fig. 1]
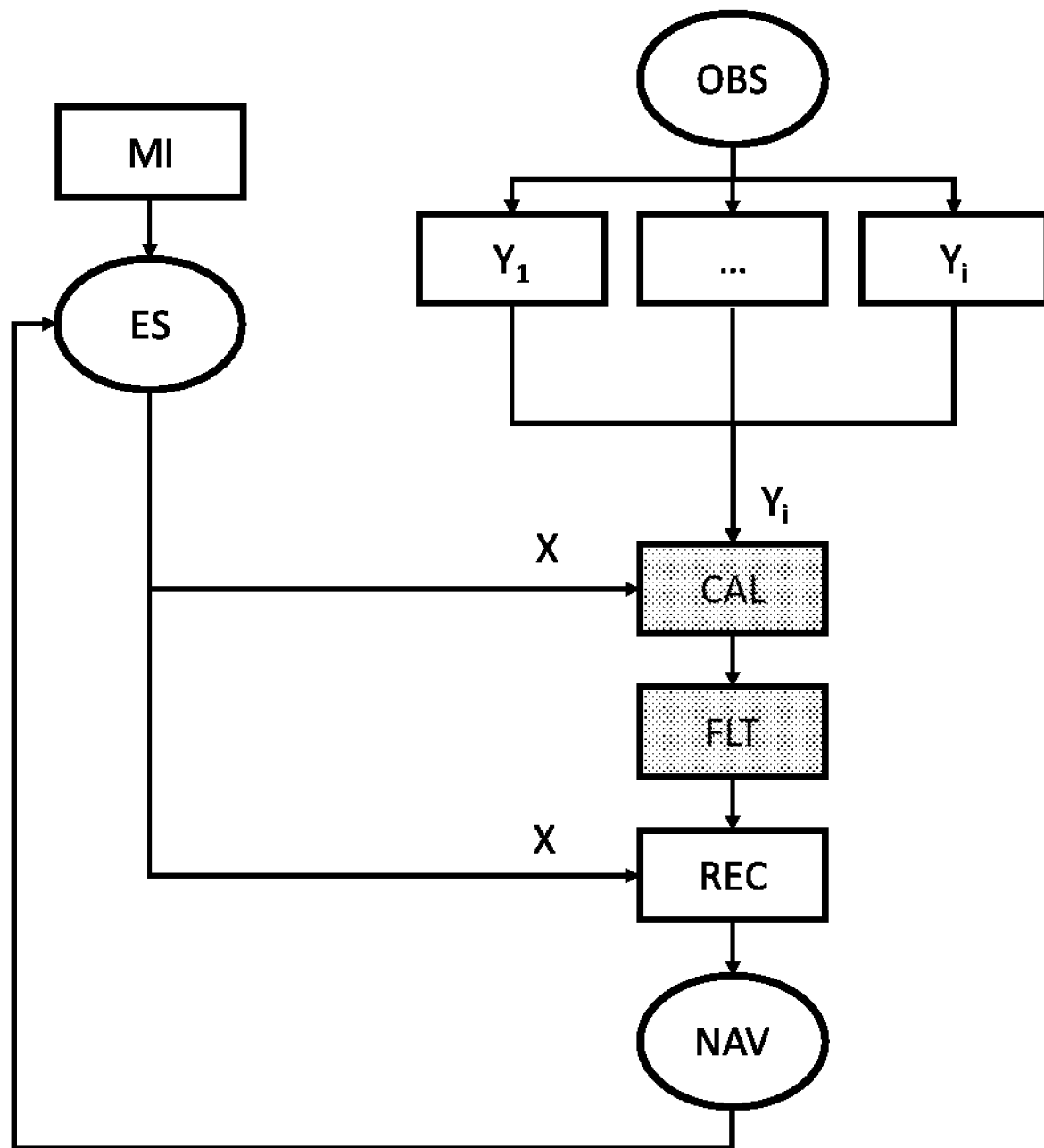

[Fig. 2]
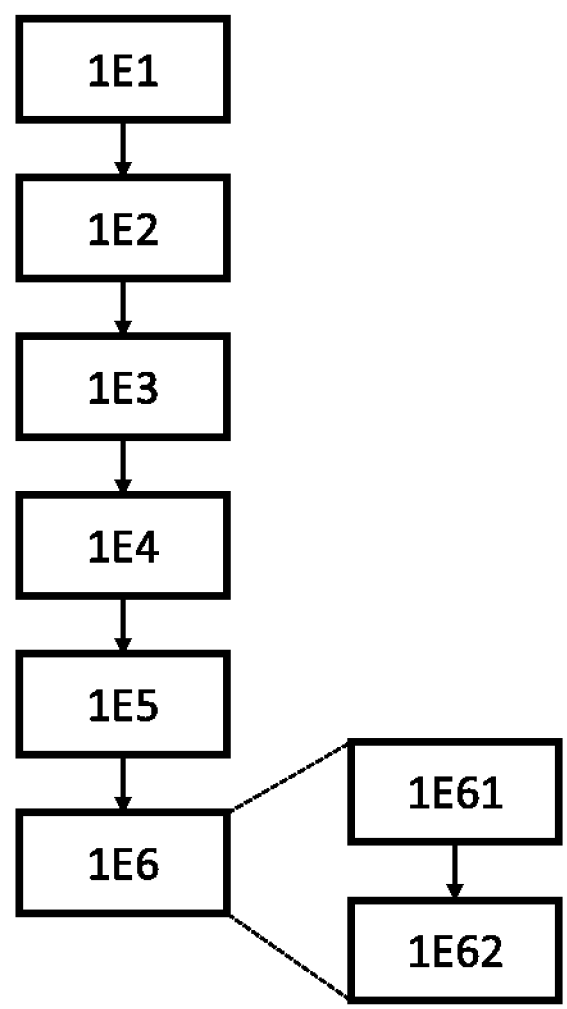

[Fig. 3]
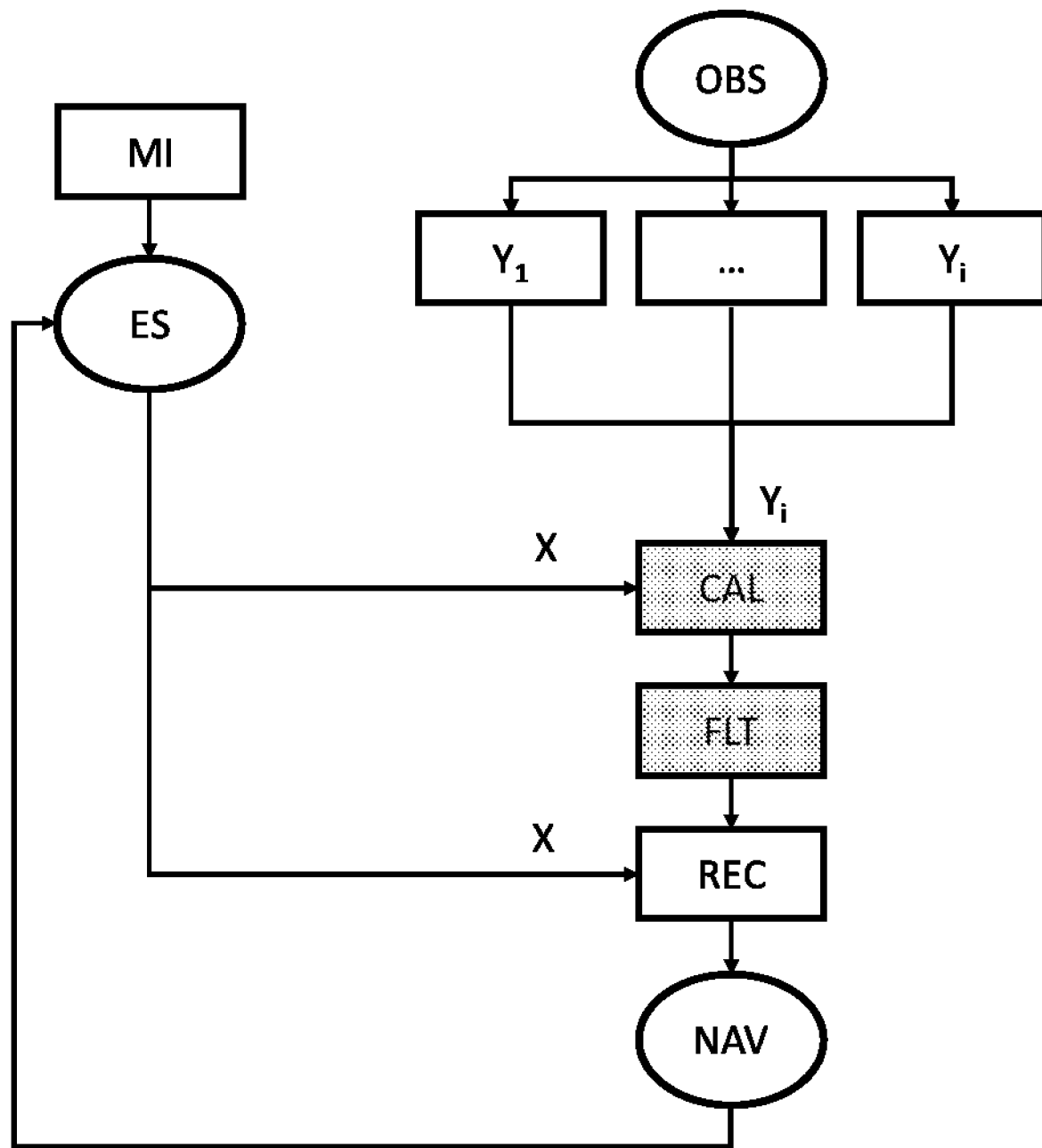

[Fig. 4]
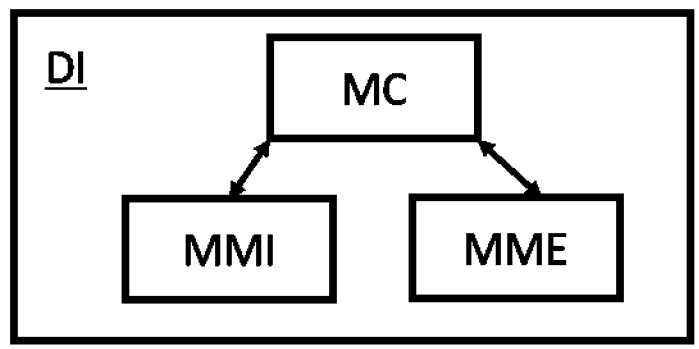

METHOD FOR STATISTICALLY CORRECTING THE ESTIMATION OF THE STATE OF A SYSTEM AND DEVICE THEREFOR

CROSS-REFERENCE TO RELATED APPLICATIONS

This application claims priority to French Patent Application No. 2201429, filed Feb. 17, 2022, the entire content of which is incorporated herein by reference in its entirety.

TECHNICAL FIELD OF THE INVENTION

The technical field of the invention is that of statistical estimation of the state of a system, especially in the context of hybrid navigation.

The present invention relates to the statistical correction of the estimation of the state of a system derived from an internal measurement using a plurality of observations and in particular to a method in which observations are ordered prior to correcting the estimation. The present invention also relates to a device configured to implement such a method.

TECHNOLOGICAL BACKGROUND OF THE INVENTION

It is common in the field of inertial positioning or navigation, especially hybrid navigation, to resort to statistical filters in order to correct predictions of an inertial unit, the correction being performed based on a measurement of an observable, for example a GPS position.

A diagram of a method according to the state of the art is illustrated in [FIG. 1], on the left hand side, from inertial measurements MI, an estimation of a state X (also referred to as state vector X) is made. On the upper right hand side, from a plurality of measurements, for example GPS measurements, a plurality of observations $Y_i$ is made. Necessary calculations for the filter are then performed CAL from the estimation of the state X and the observations $Y_i$. Then the filter FLT is implemented using the plurality of observations $Y_i$ so as to correct REC the estimation of the state to obtain an updated state. Once this state is updated, it can be used for example to correct the hybrid navigation NAV.

In this method, the calculation of the filter for obtaining the update is generally carried out by carrying out a test, referred to as the innovation test. This test consists in comparing two quantities: the observation resulting from an external measurement, this observation being characterised by the variance of its error (noted R); and an estimation (which can be assimilated to an internal measurement) of the state X, characterised by the variance of its error (noted P). The difference between these two quantities, denoted Z, is referred to as "innovation" and is therefore characterised by the variance S=P+R (assuming that the matrix H is the identity). In general, there is a matrix H for relating the state (or internal measurement) X to the observation $Y_i$ so that $Y_i$–H·X with the variance S then written as S=H·P·$H_t$+R where $H_t$ is the transpose of H.

If it is hypothesized that these two quantities obey a Gaussian statistic, then it is possible to state that the value of Z is within the interval [−kS; +kS] with a probability depending on k. In general, the value of k is chosen equal to three, this value being associated with a probability of 99.7%.

In the state of the art, when the statistical filter is a Kalman filter, when there are N observations, the error correction is done, observation by observation, using each of the observations N, corrections performed from one observation are taken into account for the next corrections.

The drawback of this approach is that it is not very robust when one of the observations is the result of an erroneous measurement. If the observation associated with an erroneous measurement is taken into account towards the end, that is after a large number of the N observables have been taken into account, it is probable that the erroneous nature of this observation will be detected. Indeed, at this stage, the variance on the state X will be small and an erroneous observation will therefore be easily detected and therefore not taken into account. On the other hand, if the observation associated with an erroneous measurement is taken into account at the beginning or in the middle, it is possible that the erroneous nature of the observation will not be detected and that the correction of the state X is made by taking this erroneous value into account.

In case of non-detection, consequences can be important. In the first case (erroneous measurement processed last), then the state is poorly estimated but it has anyway taken the first healthy observations into account, so the error is limited. In the second case (erroneous measure processed first), then the state is poorly estimated, including for the processing of the next observations. The test of the next innovations is therefore biased, not because of the observations but because of the state which has been wrongly corrected by taking the erroneous measurement into account (the error of the state updated with the failed measurement is not consistent with the variance). These tests fail and all "healthy" observations are wrongly rejected.

Therefore, there is a need for a statistical estimation method that is more robust to possible measurement errors.

SUMMARY OF THE INVENTION

The invention provides a solution to the previously discussed problems by performing classification for the observations before error correction.

A first aspect of the invention relates to a method for statistically correcting, using a statistical filter, the estimation of the state of a system at a given moment, denoted X, said state X estimated comprising a first physical quantity, correcting the estimation of this state X being carried out on the basis of a plurality of observations $Y_i$ relating to this state X, each observation being obtained by a different measurement relating to at least one second physical quantity, the method being implemented by a device comprising a calculation means, the method comprising:

a step of determining, by the calculation means, for each observation $Y_i$, the difference between the observation $Y_i$ and the state X estimated, referred to as innovation $Z_i$ using the following relationship:

$Z_i = Y_i - HX$ where H is the observation matrix associated with the statistical filter considered a step of associating, by the calculation means, an ordering parameter to each observation $Y_i$, the ordering parameter being given by the following relationship:

$Ord_i = |Z_{ref} - Z_i|$ where $Z_{ref}$ is a predetermined reference value;

a step of classifying, by the calculation means, the observations in ascending order of the ordering parameter associated therewith;

a step of correcting, by the calculation means, the errors on the estimations using the statistical filter, the corrections being made by taking the observations according to the classification performed in the previous step.

By performing ordering of the innovations as a function of the deviation from a reference value, it is possible to make the estimation more robust to measurement errors, as the observations associated with the measurement errors are taken into account last and are therefore more likely to be detected in the correction step.

In addition to the characteristics just discussed in the preceding paragraph, the method according to the first aspect of the invention may have one or more of the following additional characteristics, considered individually or according to any technically possible combinations.

In one embodiment, in the correction step, only observations such as $|Ord_i|<k \cdot S$ are taken into account with k a constant setting the interval $[-kS; +kS]$ in which the value of $Ord_i$ is to be included and S is the variance. Preferably, k is chosen equal to three, this value being associated with a 99.7% probability of having a value of Z (when $Z_{ref}=0$) within $[-kS; +kS]$.

In one embodiment, the device comprises an internal measurement means, the method comprising, prior to the step of determining the innovation $Z_i$, a step of internally measuring, by the internal measurement means, so as to obtain the state X estimated of the system.

In one embodiment, the device comprises one or more external measurement means, the method comprising, prior to the step of determining the innovation $Z_i$, a step of implementing, by said one or more external measurement means, a plurality of external measurements so as to obtain a plurality of observations $Y_i$.

In one embodiment, the reference value is taken to be zero (that is $Z_{ref}=0$).

In one embodiment, the reference value is a statistical quantity determined from the plurality of innovations $Z_i$.

In one embodiment, the statistical quantity is the average.

In one embodiment, the statistical quantity is the median.

In one embodiment, the filter is a Kalman filter and the correction step comprises, for each observation Yin the previously determined order:

A sub-step of updating the state $X_i=X_{i-1}+K_i(Y_i-H_iX_{i-1})$ where $K_i$ is the Kalman gain calculated using the observation $Y_i$, $H_i$ is the observation matrix calculated using the observation $Y_i$, $X_i$, is the state updated using the observation $Y_i$, $X_{i-1}$ is the state updated using the observation $Y_{i-1}$ and $X_0$ being equal to X, that is the state before update;

A sub-step of updating the variance $P_i=(I-K_i \cdot H_i)P_{i-1}$ where I is the identity matrix and $P_i$ is the variance updated using the observation $Y_i$, $P_{i-1}$ is the variance updated using the observation $Y_{i-1}$ and $P_0$ is the variance before update.

A second aspect of the invention relates to a device comprising, preferably an internal measurement means and a plurality of external measurement means, and means configured to implement a method according to one of the preceding claims.

A third aspect of the invention relates to a computer program comprising instructions which, when executed by a device according to a second aspect of the invention, cause the same to implement a method according to a first aspect of the invention.

A fourth aspect of the invention relates to a computer-readable data medium on which the computer program according to a third aspect of the invention is recorded.

The invention and its different applications will be better understood upon reading the following description and examining the accompanying figures.

BRIEF DESCRIPTION OF THE FIGURES

The figures are set forth by way of indicating and in no way limiting purposes of the invention.

FIG. 1 illustrates a statistical evaluation method according to the state of the art.

FIG. 2 shows a flow chart of a method according to the invention.

FIG. 3 illustrates a method according to the invention in a form allowing comparison with the state of the art of [FIG. 1].

FIG. 4 shows a device configured to implement a method according to the invention.

DETAILED DESCRIPTION

Unless otherwise specified, a same element appearing in different figures has a single reference.

Method for Statistically Correcting the Estimated State of a System

A first aspect of the invention illustrated in [FIG. 2] relates to a method 100 for statistically correcting the estimation of the state X of a system (derived from an internal measurement of the system—comprising, for example, a physical quantity relating to the state of the system such as a positional error as well as the parameters of the filter), the correction of this estimation of X being carried out using a plurality of observations $Y_i$ (from a plurality of external measurements, for example a measurement related to the physical quantity present in the state X) relating to this state (that is for characterising, at least in part, this state X—for example a mathematical relationship exists between the observation $Y_i$ and the state X estimated) where i is the index of the observation.

In one embodiment, the statistical filter is selected from: a least squares filter, a Kalman filter, an extended Kalman filter, an invariant filter, an unscented filter or even an observability-constrained filter. In the following, the invention will be illustrated using a Kalman filter, but the teachings described are also applicable to other statistical filters, especially to the other statistical filters already recited.

Internal Measurement

In one embodiment, the method comprises an internal measurement step 1E1 so as to obtain the estimation of the state X of the system. Alternatively, this state X may be communicated to the device implementing the method 100 according to the invention, for example using an input means or automatically via a communication means, for example a network card (for example a WiFi card). For example, the internal measurement could be implemented using a block of inertial sensors and relate to the acceleration, velocity and/or position of a wearer.

External Measurements

In one embodiment, the method comprises a step 1E2 of implementing a plurality of external measurements so as to obtain a plurality of observations $Y_i$. Alternatively, this plurality of observations $Y_i$ can be communicated to the device implementing the method according to the invention, for example using an input means or automatically via a communication means, for example a network card (for example a WiFi card).

In the method according to the invention, each observation $Y_i$ of the plurality of observations $Y_i$ is obtained independently of the other observations using a measurement, the plurality of measurements for obtaining the plurality of observations being implemented by one measurement means or a plurality of measurement means. In one embodiment, the measurement means is a GPS receiver and each observation $Y_i$ is made using a different satellite by the GPS receiver, the measurement therefore being characterised by the satellite used. In other words, a plurality of independent observations does not necessarily imply a plurality of measurement means, simply a plurality of independent measurements (here a plurality of satellites), for example by a same measurement means (here the GPS receiver). This is only one example, and the measurement means could for example be inertial equipment in which case each observation $Y_i$ will be relating to a virtual measurement of zero speed, referred to as ZUPT (for Zero UPdaTe).

Calculating the Innovation

The method according to the invention then comprises a step 1E3 of determining, for each observation $Y_i$, the difference between said observation $Y_i$ and the state X estimated, referred to as innovation $Z_i$. In the case of a Kalman filter, this innovation is given by the following relationship:

$$Z_i = Y_i - HX$$

where H is the observation matrix of the Kalman filter. In other words, in this example, for each observation $Y_i$, the innovation $Z_i$ associated with the observation that is the deviation between the observation $Y_i$ and the state X estimated, here multiplied by the observation matrix H, will be calculated.

Ordering the Observations

It is then possible to order each observation $Y_i$ as a function of the difference thus calculated, that is as a function of the innovation $Z_i$, associated with each observation $Y_i$.

For this, the method first comprises a step 1E4 of associating, with each observation $Y_i$, an ordering parameter, denoted $Ord_i$, the ordering parameter being given by the following relationship:

$$Ord_i = |Z_{ref} - Z_i|$$

where $Z_{ref}$ is a predetermined reference value.

The method then comprises a step 1E5 of classifying the observations $Y_i$ in ascending order of the ordering parameter $Ord_i$ associated therewith. Thus, the observation associated with the ordering parameter having the lowest value will be classified first and the observation associated with the ordering parameter having the highest value will be classified last.

In one embodiment, the reference value is taken to be zero (that is $Z_{ref}=0$). In this embodiment, it is reasonably hypothesized that the observation associated with a defective measurement device will tend to produce a greater innovation than that produced by an observation associated with a functional measurement device.

In one alternative embodiment the reference value is a statistical quantity determined from the plurality of innovations $Z_i$ determined from the plurality of observations $Y_i$.

In one exemplary embodiment relating to the implementation of a statistical filter for inertial navigation, the statistical quantity is the average of the plurality of innovations $Z_i$. Indeed, assuming n innovations relating to a functional measurement means and therefore to a healthy observation, referred to as healthy innovations, and m innovations relating to a non-functional measurement means and therefore to a wrong observation, referred to as failed innovations, the healthy and failed innovations are given by the following expressions:

For healthy innovations:

$$Z\text{healthy}_i = \varepsilon_{measurement_i} + \varepsilon_{navigation}$$

For failed innovations $$Z_{failed_j} = \varepsilon_{measurement_j} + \varepsilon_{navigation} + \epsilon_{failed_j}$$

Where $i \in [1,n]$ and $j \in [1,m]$.

In the two expressions that precede:

$\varepsilon_{navigation}$ represents the error between true navigation and the navigation estimated and is therefore constant for each observation; it depends on the estimated value of the navigation;

$\varepsilon_{navigation}$ measures the error between true navigation and the measurement of that navigation; it is therefore specific to each observation (or measurement);

$\epsilon_{failed_j}$ represents the error between true navigation and the measurement of this navigation due to the failure; it is therefore the term representing the failure of the satellite j considered.

If the measurement means is a GPS receiver, then the sum m+n represents the total number of satellites tracked by the GPS receiver (each satellite providing an observation $Y_i$) and considered by the statistical filter, for example the Kalman filter.

In this case, the average of the innovations $Z_i$ can be obtained using the following relationship:

$$\text{Average}(Z_i) = \sum_{i=1}^{m+n} \frac{Z_i}{m+n}$$

This expression can be expanded the following way:

$$\text{Average}(Z_i) = \frac{1}{m+n} \times \left( \sum_{i=1}^{m} Z\,\text{failed}_i + \sum_{i=1}^{n} Z\,\text{healthy}_i \right)$$

Expanding further and redistributing these terms, this expression becomes:

$$\text{Average}(Z_i) = \frac{1}{m+n} \times \left( \sum_{i=1}^{m+n} \left( \varepsilon_{measurement_i} + \varepsilon_{navigation} \right) + \sum_{i=1}^{n} \epsilon_{failed_i} \right)$$

The previous expression can be rewritten as follows:

$$\text{Average}(Z_i) = \varepsilon_{navigation} + \frac{1}{m+n} \times \sum_{i=1}^{m+n} \varepsilon_{measurement_k} + \frac{1}{m+n} \times \sum_{i=1}^{n} \epsilon_{failed_i}$$

And so, the deviation from this average becomes:
for a healthy innovation:

$$Z\,\text{healthy}_i - \text{Average}(Z_i) =$$

$$\varepsilon_{measurement_i} - \frac{1}{m+n} \times \sum_{i=1}^{m+n} \varepsilon_{measurement_i} - \frac{1}{m+n} \times \sum_{i=1}^{n} \epsilon_{failed_i}$$

for a failed satellite innovation:

$$Z\,\text{failed}_j - \text{Average}(Z) =$$

-continued $$\varepsilon_{measurement_j} + \epsilon_{failed_j} - \frac{1}{m+n} \times \sum_{i=1}^{m+n} \varepsilon_{measurement_i} + \frac{1}{m+n} \times \sum_{i=1}^{n} \epsilon_{failed_i}$$

The term $$\frac{1}{m+n} \times \sum_{i=1}^{m+n} \varepsilon_{measurement_i}$$

can then be approximated as the variation in atmospheric error depending on the elevation of the satellite (taken to be about 30 m). This uncertainty in the GPS measurement therefore provides a "detection bias" of about 30 m. With regard to the term $$\frac{1}{m+n} \times \sum_{i=1}^{n} \epsilon_{failed_i}$$

the larger me number of satellites tracked, the smaller the term. Similarly, the lower the number of failed satellites or the lower the norm of failures, the lower the term. The innovations of the failed satellites will therefore be spaced apart from the healthy innovations by a "distance" equal to the norm of the bias on the pseudorange brought about by the failure, plus or minus the "detection bias".

A failed innovation could therefore be detected provided that the norm of the failure on the pseudorange measurement is greater than this "detection bias". Once the failed satellite is identified, the observation associated with that satellite could be placed in the last row of observations. The detection capability of this solution will then depend on the number of healthy observations placed before this failed observation, and the update gains applied for each healthy satellite.

For a failure with a norm greater than the uncertainty bias, sorting the innovations according to the invention makes it possible to make the multi-observation update more robust.

In the previous example, the statistical quantity considered is the mean. However, this is only one example and other statistical quantities can be used, such as the median.

Correcting the Errors Based on Ordering

Finally, the method comprises a step 1E6 of correcting errors on the estimation of the state X using the statistical filter, corrections being made by processing the observations $Y_i$ according to the classification performed in the previous step 1E5. It is understood that, during this step 1E6, correcting the estimation of the state X using a given observation takes account of the previous corrections made using the observables located before in the ordering. In one embodiment, in the correction step, only observations $Y_i$ such as $|Ord_i| < k \cdot S$ are taken into account with k a constant setting the interval $[-kS; +kS]$ in which the value of $Ord_i$ is to be included and S is the variance. Preferably, k is equal to three (3).

For example, in the case of a Kalman filter, this step 1E6 comprises, for each observation $Y_i$, in the previously determined order:

A sub-step 1E61 of updating the state $X_i = X_{i-1} + K_i(Y_i - H_i X_{i-1})$ where $K_i$ is the Kalman gain calculated using the observation $Y_i$, $H_i$ is the observation matrix calculated using the observation $Y_i$, $X_i$ is the state updated using the observation $Y_i$, $X_{i-1}$ is the state updated using the observation $Y_{i-1}$ and $X_0$ being equal to X, that is the state before update (with $Ord_i > Ord_{i-1}$);

A sub-step 1E62 of updating the variance $P_i = (I - K_i \cdot H_i) P_{i-1}$ where $K_i$ is the Kalman gain calculated using the observation $Y_i$, $H_i$ is the observation matrix calculated using the observation $Y_i$, I is the identity matrix, $P_i$ is the variance updated using the observation $Y_i$, $P_{i-1}$ is the variance updated using the observation $Y_{i-1}$ and $P_0$ is the variance before update.

For the record, the observation matrix $H_i$ is deduced from characteristics of the measurements $Y_i$ and the relationship between these measurements and the state of the system. The Kalman gain $K_i$ is then deduced from the observation matrix. Once these preliminary calculations have been made, then the update can be performed.

The previous substeps 1E61, 1E62 can be generalised to any gain value (that is for any statistical filter) using the Joseph formula well known to the skilled person. Preferably, in this example, only observations $Y_i$ such as $|Ord_i| < k \cdot S$ are taken into account during the update.

For the record, in the state of the art illustrated in [FIG. 1], these sub-steps are iterated for each observation $Y_i$ without these observations having been previously classified with all the drawbacks detailed above. In contrast, as provided in the present invention and illustrated in [FIG. 3] via the square ORD illustrating the ordering insertion in the method of prior art, observations $Y_i$ are classified before corrections are made.

Device According to the Invention

A second aspect of the invention relates to a device DI comprising means configured to implement a method according to the invention. The device according to the invention comprises a calculation means MC (for example a processor or even an ASIC card) associated with a memory (for example a RAM memory and/or a hard disk), said memory comprising the instructions and data necessary for implementing a method 100 according to the invention.

In one embodiment, the device DI also comprises internal measurement means MMI to provide an estimate of the state of the system, for example a block of inertial sensors to provide an estimate of the acceleration, velocity and position of a wearer.

In one embodiment, the device DI also comprises one or more external measurement means MME for obtaining a plurality of observations associated with the state of the system, for example a GPS receiver allowing, using a plurality of satellites, a plurality of measurements of the position of a wearer.

Furthermore, for both embodiments, the calculation means MC is configured to communicate with the internal measurement means and/or the or each external measurement means, for example to perform a measurement or to acquire the values measured.

In one embodiment, the device also comprises input means (for example a keyboard or a touch screen) and display means (e.g. a screen or a touch screen) so as to allow an operator to input the parameter(s) necessary for the implementation of the method 100 according to the invention, or else to view the state of the system (e.g. the position of a wearer) before and after correction.

The invention claimed is:

1. A method for statistically correcting, using a statistical filter, an estimation of the state of a system, denoted X, said state X comprising a first physical quantity, correcting the estimation of said state X being carried out on the basis of a plurality of observations $Y_i$ relating to said state X, each observation being obtained by a different measurement relating to at least one second physical quantity, the method being implemented by a device comprising a calculator, the method comprising:

a step of determining, by the calculator, for each observation $Y_i$, a difference between the observation $Y_i$ and the state X estimated, referred to as innovation $Z_i$, using the following relationship:

$Z_i = Y_i - HX$ where H is the observation matrix associated with the statistical filter considered a step of associating, by the calculator, an ordering parameter with each observation $Y_i$, the ordering parameter being given by the following relationship:

$Ord_i = |Z_{ref} - Z_i|$ where $Z_{ref}$ is a predetermined reference value;

a step of classifying, by the calculator, the observations in ascending order of the ordering parameter associated therewith;

a step of correcting, by the calculator, errors on the estimations using the statistical filter, corrections being made by taking the observations according to the classification performed in the previous step.

2. The method according to claim 1, wherein the device comprises an internal measurement system, the method comprising, before the step of determining the innovation $Z_i$, an internal measurement step, by the internal measurement system, so as to obtain the state X estimated of the system.

3. The method according to claim 1, wherein the device comprises one or more external measurement system, the method comprising, before the step of determining the innovation $Z_i$, a step of implementing, by said one or more external measurement system, a plurality of external measurements so as to obtain a plurality of observations $Y_i$.

4. The method according to claim 1, wherein the reference value is taken to be zero (that is $Z_{ref} = 0$).

5. The method according to claim 1, wherein the reference value is a statistical quantity determined from the plurality of innovations $Z_i$.

6. The method according to claim 5, wherein the statistical quantity is an average.

7. The method of claim 5, wherein the statistical quantity is a median.

8. The method according to claim 1, wherein the filter is a Kalman filter and the correction step comprises, for each observation $Y_i$, in the previously determined order:

a sub-step (1E61) of updating the state $X_i = X_{i-1} + K_i(Y_i - H_i H_{i-1})$ where $K_i$ is the Kalman gain calculated using the observation $Y_i$, $H_i$ is the observation matrix calculated using the observation $Y_i$, $X_i$ is the state updated using the observation $Y_i$, $X_{i-1}$ is the state updated using the observation $Y_{i-1}$ and $X_0$ being equal to X, that is the state before update;

a sub-step (1E62) of updating the variance $P_i = (1 - K_i \cdot H_i) P_{i-1}$ where I is the identity matrix, $P_i$ being the variance updated using the observation $Y_i$, $P_{i-1}$ is the variance updated using the observation $Y_{i-1}$ and $P_0$ is the variance before update.

9. A device comprising means configured to implement a method according to claim 1.

10. A non-transitory computer-readable data medium, comprising instructions, which when executed by a processor, perform the method according to claim 1.

* * * * *